Fig. 1

INVENTOR.
WALTER R. GRISWOLD
BY
Attorneys

July 12, 1960 W. R. GRISWOLD 2,944,655
APPARATUS FOR UNLOADING ARTICLES FROM A MOVING CONVEYOR
Filed Sept. 13, 1955 5 Sheets-Sheet 2

Fig. 2

INVENTOR.
WALTER R. GRISWOLD
BY
Attorneys

INVENTOR.
WALTER R. GRISWOLD
BY
Attorneys

July 12, 1960 W. R. GRISWOLD 2,944,655
APPARATUS FOR UNLOADING ARTICLES FROM A MOVING CONVEYOR
Filed Sept. 13, 1955 5 Sheets-Sheet 5

Fig. 10

INVENTOR.
WALTER R. GRISWOLD
BY Andrus & Scales
Attorneys

United States Patent Office 2,944,655
Patented July 12, 1960

2,944,655

APPARATUS FOR UNLOADING ARTICLES FROM A MOVING CONVEYOR

Walter R. Griswold, Chicago, Ill., assignor to A. O. Smith Corporation, Milwaukee, Wis., a corporation of New York Filed Sept. 13, 1955, Ser. No. 534,059

13 Claims. (Cl. 198—35)

This invention relates to an apparatus for unloading articles from a moving hook conveyor and more particularly to an apparatus for unloading vehicle frames from a hook conveyor and lowering the frames into a stacked position.

In the assembly of vehicle frames, the various vehicle frame elements are assembled together on an assembly line to form the frame and the assembled frame is then gauged or inspected and subsequently loaded on a moving hook conveyor which passes through a paint area where the frames are painted. After passing through drying ovens, the frames are unloaded from the hook conveyor, lowered to a horizontal position and stacked in position to be removed from the area. The present invention is directed to a method and apparatus for automatically removing each of the vehicle frames from the respective conveyor hook and for lowering the frame onto a stack.

According to the invention the hook conveyor consists of a series of moving spaced hooks which engage the vehicle frame and hold the frame in a vertical position while moving the frame through the paint area. The unloading apparatus includes a framework which supports the hook conveyor and also carries a pair of inclined conveyors having a series of lugs attached thereto which are adapted to engage the body brackets on the frame as the frame approaches the framework and lift the frame upwardly from the respective conveyor hook. Associated with each inclined conveyor is a crank arm which engages the body bracket of the frame when the frame is at the uppermost point on the inclined conveyor and moves the frame forwardly at an increased rate of speed out of registry with the respective hook and deposits the frame on a pivotable boom.

The boom is adapted to be pivoted downwardly to place the frame on a downwardly moving conveyor and this conveyor deposits the frame on a stack of frames which is supported by a hydraulic cylinder. The stack is lowered in increments by the cylinder as each succeeding frame is placed on the stack and the entire stack is eventually lowered onto a horizontal conveyor which moves the stack to a storage position.

The present invention provides means for automatically unloading conveyor frames from a hook conveyor and stacking the unloaded frames in a storage area. The present apparatus eliminates the numerous handling operations normally employed in the unloading of vehicle frames from the hook conveyor and thereby substantially reduces the labor cost of unloading and reduces the time necessary for the unloading operation to be performed.

The drawings illustrate the best mode presently contemplated of carrying out the invention.

The drawings illustrate an apparatus for conveying, unloading and stacking vehicle frames 1. The vehicle frame 1 consists generally of a pair of side rails 2 which extend the length of the frame and are connected by a motor mount 3 and an end bar 4. A series of body brackets 5 extend outwardly from the side rails 2 and serve to support the body of the vehicle.

The apparatus for conveying and unloading the frames 1 comprises a framework which includes a series of upright columns 6 and a pair of outrigger columns 7 which are secured in an upright position to a foundation 8. The columns 6 are secured together at their upper ends by a pair of upper ties 9 and the ties 9 and outriggers 7 are attached to form an integral structure by a series of cross ties 10.

The cross ties 10 support a hook conveyor which carries the frames 1 in spaced relation. The hook conveyor comprises a beam 11 which is secured to the underside of cross ties 10 and serves as a track for a plurality of carriages 12 which are adapted to ride on the beam 11. Each of the carriages 12 carries a series of rollers 13 which ride on the lower flange of beam 11 on either side of the web thereof.

Each of the carriages 12 supports a pair of conveyor hooks 14 which are adapted to engage the motor mount 3 of the vehicle frame and support the frame in a vertical position. The hooks 14 are freely mounted on pins 15 which extend through the respective carriages and this construction enables the hooks to be pivoted about pins 15 in relation to the carriage. The lower end of each of the hooks 14 is bent upwardly to provide a lip 16 which engages the motor mount and prevents the frame from slipping from the hook.

Figure 1:
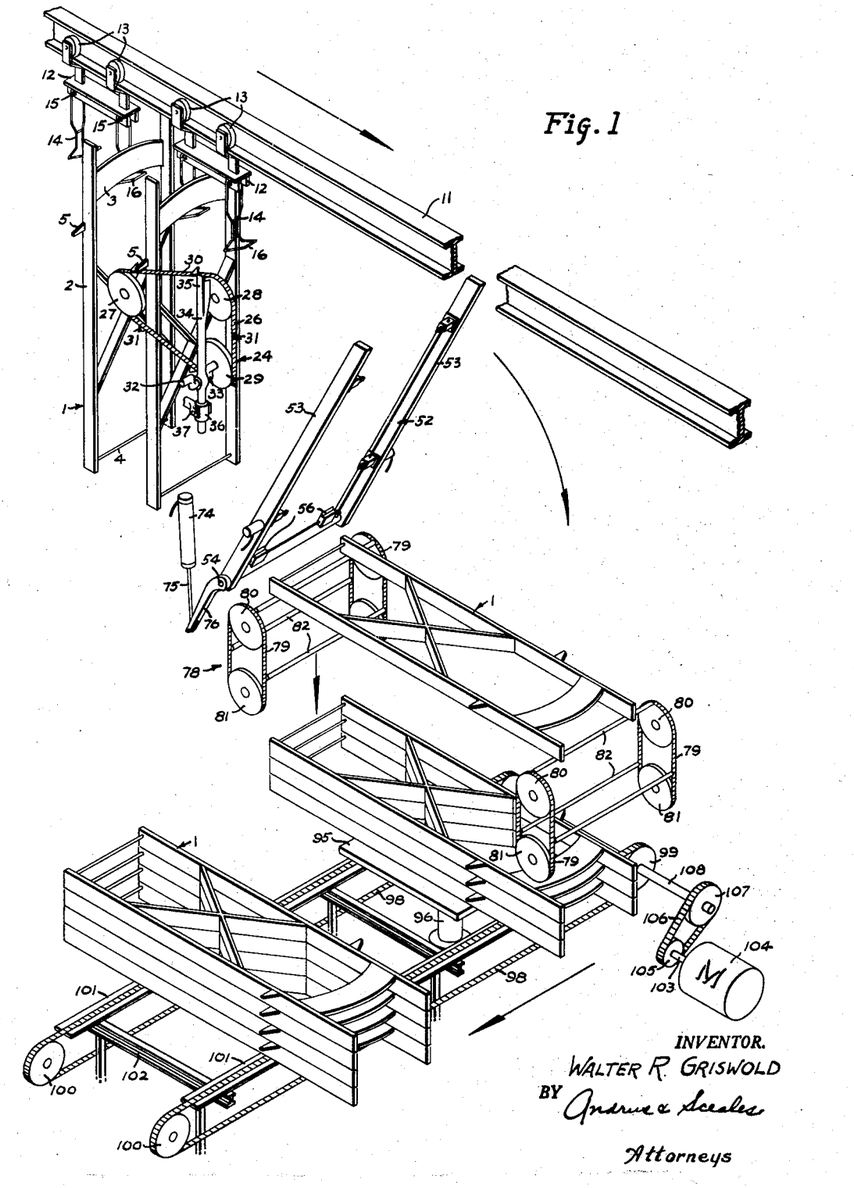
Figure 1 is a diagrammatic perspective view of the present invention.
Figure 2:
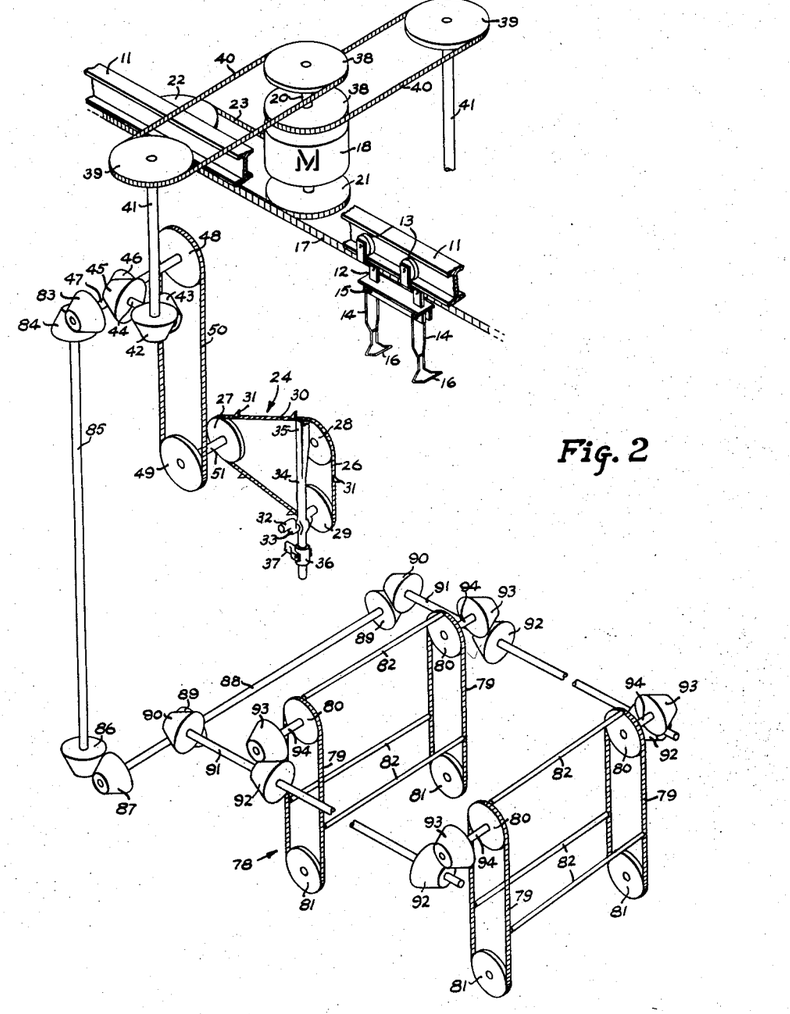
Fig. 2 is a diagrammatic representation of the drive for hook conveyor and vertical conveyor.
Figure 3:
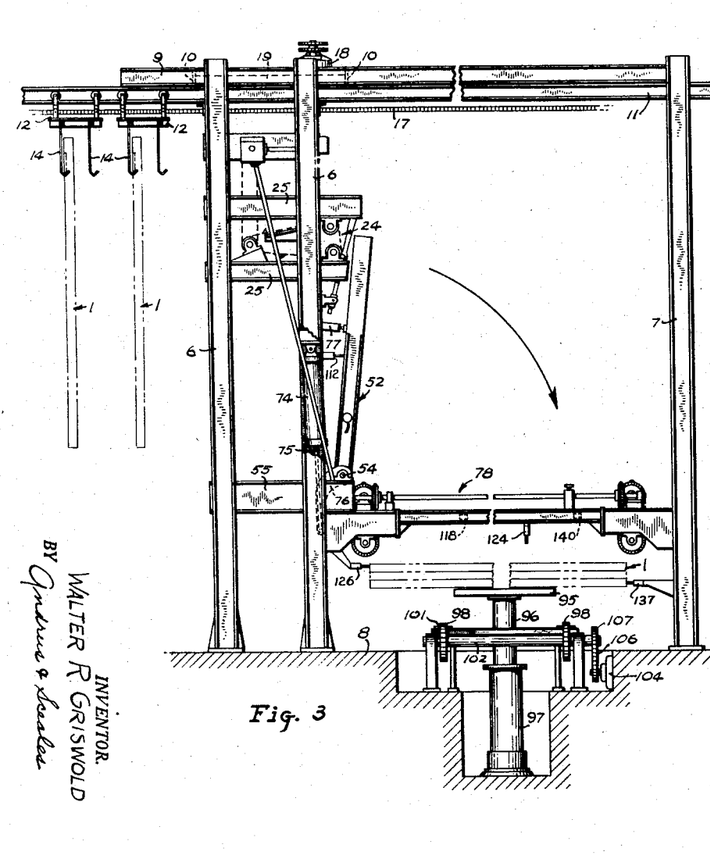
Fig. 3 is a side elevation of the apparatus.

The carriages 12 are driven along the beam 11 to convey the vehicle frames 1 by means of an endless chain 17 which is secured to each of the carriages 12. This is best shown in Fig. 2. A motor 18 is secured to plates 19 which connect columns 6, and the shaft 20 of motor 18 drives a sprocket 21. The sprocket 21 in turn drives an idler sprocket 22 through drive chain 23. The chain 23 is provided with a series of lugs or projections which engage the chain 17 on the carriages 12. With this construction operation of motor 18 drives the chain 23 which in turn drives chain 17 and moves the carriages 12 along the beam 11.

The frames 1 are removed from the conveyor hooks 14 by an endless lifter conveyor 24 which is supported by beams 25 connecting columns 6. The lifter conveyor 24 includes a generally triangular endless chain 26 which is disposed about drive sprocket 27 and idler sprockets 28 and 29. The chain 26 is designed with an inclined portion 30 which extends upwardly in the direction of movement of the frames 1. The chain 26 carries a series of lugs 31 which are adapted to engage the body brackets 5 on the frames 1 and lift the frame from engagement with the respective hook 14.

Figure 4:
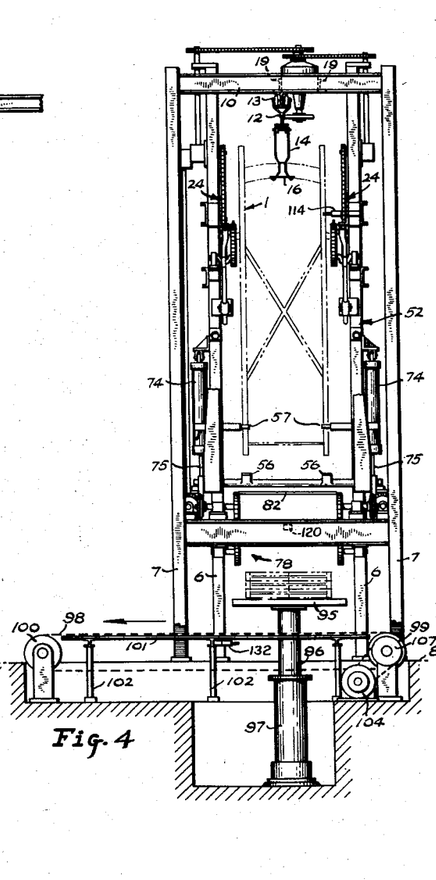
Fig. 4 is an end view of the apparatus.
Figures 5, 6:
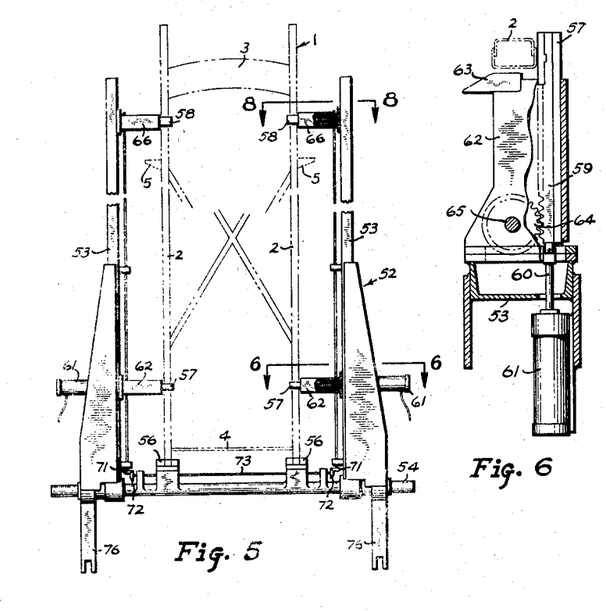
Fig. 5 is an enlarged end view of the boom with the fingers extended.
Fig. 6 is a transverse section taken along line 6—6 of Fig. 5.
Figure 7:
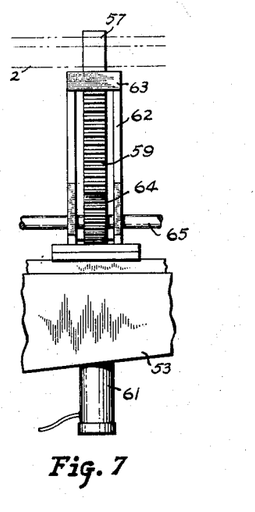
Fig. 7 is a side elevation of the structure of Fig. 6.
Figure 8:
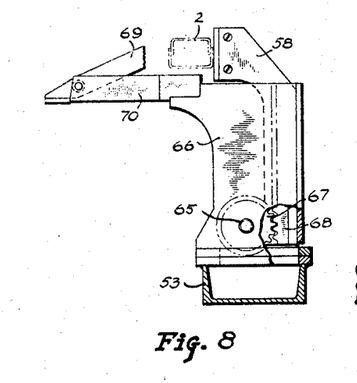
Fig. 8 is a transverse section taken along line 8—8 of Fig. 5.
Figure 9:
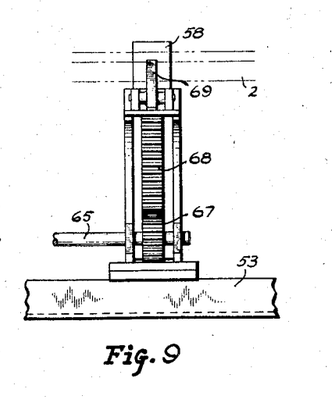
Fig. 9 is a side elevation of the structure of Fig. 8.

As shown in Fig. 4 there are two lifter conveyors 24 each of which is adapted to engage the body brackets 5 of opposite side rails 2 of the frame. The lifter conveyor is positioned so that the lowermost end of the inclined portion 30 is disposed a slight distance beneath the plane of travel of body brackets 5 and the uppermost end of the inclined portion 30 is disposed a slight distance above the path of travel of the body brackets. With this construction as the frames are moved by the hook conveyor the body brackets 5 engage the inclined portion 30 of the chain 26, and the lugs 31 on the chain 26 then move the frame upwardly along the inclined portion of the conveyor 24. The speed of the lifter conveyor 24 is substantially the same as the speed of the hook conveyor so that the frames while being elevated from the lip 16 of the conveyor hooks 14 will remain in general vertical alignment with respect to the hook.

To move the frame 1 forwardly out of registry with the respective hook a crankshaft 32 is secured to idler sprocket 29. The crankshaft 32 is suitably journaled to the framework and carries a crank 33. An arm 34 is rotatably secured to crank 33 and the upper end of arm 34 is bifurcated to provide a finger 35 which is adapted to engage the body bracket 5 of the frame.

The lower end of arm 34 is slidably disposed within a sleeve 36 which is pivotally connected by means of a bracket 37 to a column 6.

The crankshaft 32 rotates with the sprocket 29 and the finger 35 of arm 34 thereby inscribes a generally circular path of travel adjacent the uppermost end of the inclined portion 30 of the lifter conveyor 24. The arm 34 is positioned such that the finger 35 moves upwardly in its circular path of movement when the frame 1, moving upwardly on the lifter conveyor 24, reaches the uppermost end of the inclined portion 30 so that the finger will engage the body brackets 5 of the frame and lift the frame further upwardly from the conveyor hook. As the fingers move downwardly in their path of travel, the frame 1 which is supported by the fingers is then moved forwardly and downwardly out of registry with the respective hook. The speed of rotation of the crankshaft 32 and the speed of travel of the finger 35 is slightly greater than the speed of travel of the chain 26 so that the frame can be moved forwardly and downwardly from the hook 14 without interference from the same.

The drive for each of the lifter conveyors 24 is taken off from the motor 18 and each drive system, as shown in Fig. 2, includes a sprocket 38 which is attached to drive shaft 20. Each sprocket 38 is operably connected to a sprocket 39 by a chain 40, and the sprocket 39 is secured to the upper end of a shaft 41. The lower end of shaft 41 carries a beveled gear 42 which meshes with a gear 43 secured to one end of shaft 44. The other end of shaft 44 carries a gear 45 which engages bevel gear 46 carried by shaft 47. A sprocket 48 is secured to shaft 47 and is connected to a sprocket 49 through chain 50. The sprocket 49 is secured to a shaft 51 which carries sprocket 27 of the inclined conveyor 24. With this drive system rotation of the motor shaft 20 is transmitted through the gear and sprocket drive to the drive sprocket 27 to drive the lifter conveyor 24 in synchronization with the hook conveyor.

The fingers 35 are adapted to place the vehicle frame 1 on a boom 52, and the boom in turn lowers the frame to a generally horizontal position. The boom 52 includes a pair of arms 53 which are secured to a shaft 54. The shaft 54 is suitably journaled to beams 55 which are secured to column 6 of the supporting framework.

The boom 52 is provided with a pair of saddles 56 which are secured in spaced relation to shaft 54 between the arms 53 and are attached to receive and support the lower ends of the side rails 2 of the vehicle frame 1.

The arms 53 are spaced apart a distance which is slightly greater than the width of the frame 1 and the frame is supported between the arms 53 by a pair of lower stops 57 and a pair of upper stops 58 which are adapted to engage the side rails of the frame.

Each of the lower stops 57 is moved inwardly and withdrawn outwardly by means of a rack 59 which is secured to the stop 57. The outer end of the rack 59 is secured to the ram 60 of a double-acting hydraulic cylinder 61 which is supported by the respective arm 53. The rack 59 is slidably mounted within a bracket 62 which is secured to the arm 53 and by extending ram 60, rack 59 is moved outwardly within brackets 62 to position the stop 57 in a location to receive the side rail of the vehicle frame. By retracting ram 60 within cylinder 61 the rack is withdrawn and the stop 57 is moved outwardly out of contact with the side rail of the frame so that the frame can then pass freely between the arms 53.

The side rails of the vehicle frame are guided toward the stops 57 by an approach 63 which is secured to the bracket 62 ahead of the stop.

The upper stops 58 are moved in synchronization with the lower stops 57 by means of a power take-off including a gear 64 which is driven by reciprocating movement of rack 59. The gear 64 is secured to the inner end of a shaft 65 which is journaled within bracket 62, and the outer end portion of shaft 65 is suitably journaled within a bracket 66 which is attached to arm 63. The outer end of shaft 65 carries a gear 67 which drives a rack 68 that is slidably mounted in bracket 66. The outer end of rack 68 is secured to the stop 58. With this construction, as rack 59 is moved through action of ram 60, the movement of the rack is transmitted through gear 64, shaft 65 and gear 67 to the rack 68 which moves the stop 58 in accordance with movement of stop 57.

To prevent displacement of the frame from the stops 58, a dog 69 is pivotally attached to an extension 70 which is secured to bracket 66. The side rail of the frame is adapted to pivot the dog when received by the boom and the inner end of the dog then pivots upwardly to prevent the side rail from moving outwardly with respect to the stop.

The stop mechanism associated with each of the arms 53 is synchronized by a drive system that includes a bevel gear 71 which is attached to the lower end of each of the shafts 65. Gears 71 mesh with bevel gears 72 which are secured to the ends of a shaft 73. With this structure the movement of stops 57 and 58 on each of the arms 53 is synchronized.

The boom 52 is pivoted from a generally upright position downwardly to a generally horizontal position by a pair of double-acting hydraulic cylinders 74 which are suitably connected to a source of high pressure fluid. The ram 75 of each of cylinders 74 is pivotally connected to a crank arm 76 which is secured to shaft 54. By withdrawing the rams 75 within cylinders 74 the arms 53 are pivoted downwardly. Conversely, extending the rams 75 pivots the arms 53 upwardly to a position approximating the vertical.

The upward pivotal movement of the boom is limited by a pair of bumpers 77 which are secured to columns 6. The arms 53 are adapted to engage the bumpers 77 and stop the upward pivotal movement of the boom.

An elevator unit 78 receives the vehicle frame 1 from the boom 53 and lowers the frame onto a stack. The elevator unit 78 comprises four endless conveyor chains 79, each of which travels on a drive sprocket 80 and an idler sprocket 81. Each adjacent pair of chains 79 is connected together by a series of bars 82 which are disposed in position to receive the front and rear ends of the side rails of the frame as the same is released from the boom 52. Each connected pair of chains 79 rotate inwardly of the elevator unit to lower the vehicle frame which is supported on the bars 82.

The chains 79 are driven in a take-off from motor 18 whereby a gear 83 is secured to the end of shaft 47 and drives a gear 84 which is carried by the upper end of shaft 85. The lower end of shaft 85 supports a gear 86 which drives a gear 87 secured to shaft 88. A pair of beveled gears 89 are secured to shaft 88 and drive gears 90 on shaft 91. Each of the shafts 91 carries a pair of gears 92 and each of the gears 92 drives a gear 93 secured to shaft 94. The drive sprockets 80 are secured to the shafts 94 and are rotated in accordance with rotation of the shafts. With this drive system the hook conveyor, the endless conveyors 24, the crankshaft 32 and the elevator units 78 are driven in synchronization from motor 18.

The elevator unit 78 lowers each vehicle frame 1 onto a platform 95 which is supported by the ram 96 of a double-acting hydraulic cylinder 97. The ram 96 is actuated by introducing hydraulic fluid from a source, not shown, into the cylinder 97, and as each frame 1 is deposited on platform 95 the ram is retracted to lower the platform a sufficient distance to permit the succeeding frame to be stacked on the frame supported on the platform.

The platform 95 and cylinder 97 are disposed between a pair of spaced horizontal chain conveyors 98. Each of the chains 98 travels about a drive sprocket 99 and an idler sprocket 100. As the ram 96 is retracted, the frames 1 supported on the platform 95 are lowered in increments and additional frames stacked thereon until a predetermined number of frames are disposed in the stack. The ram then retracts fully to lower the platform beneath the level of the chain conveyors 98 and deposit the stack of frames thereon.

To prevent deflection of the chains 98 by the stack of frames, the portion of each of the chains traveling in the upper path of movement rides on a support member 101 which is supported above foundation 8 by a suitable structure 102.

The chains 98 are driven to move the supported stack of frames to a storage position by means of a drive system in which the drive shaft 103 of a motor 104 carries a sprocket 105, and the sprocket 105 is connected through a chain 106 to a sprocket 107 which is secured to shaft 108. The drive sprockets 99 are secured to shaft 108 and are driven thereby.

In operation of the present apparatus, the frames are attached to the hook conveyor by engaging hooks 14 with the edge of the motor mount 3 and the frames are thus supported in a vertical manner. The hook conveyor is driven by drive chain 23 to move the hooks and attach frames through the painting area and the drying ovens.

After leaving the drying ovens, the frames approach the lifter conveyors 24 where the body brackets 5 of the frame engage the inclined portion 30 of the endless conveyors and the frame is moved upwardly from the respective hook. When the frame reaches the end of the inclined portion 30, the fingers 35 engage the body brackets 5 and move the frame upwardly and forwardly over the lip 16 of the hook and then downwardly to deposit the frame on the stops 57 and 58 of the boom 52.

Figure 10:
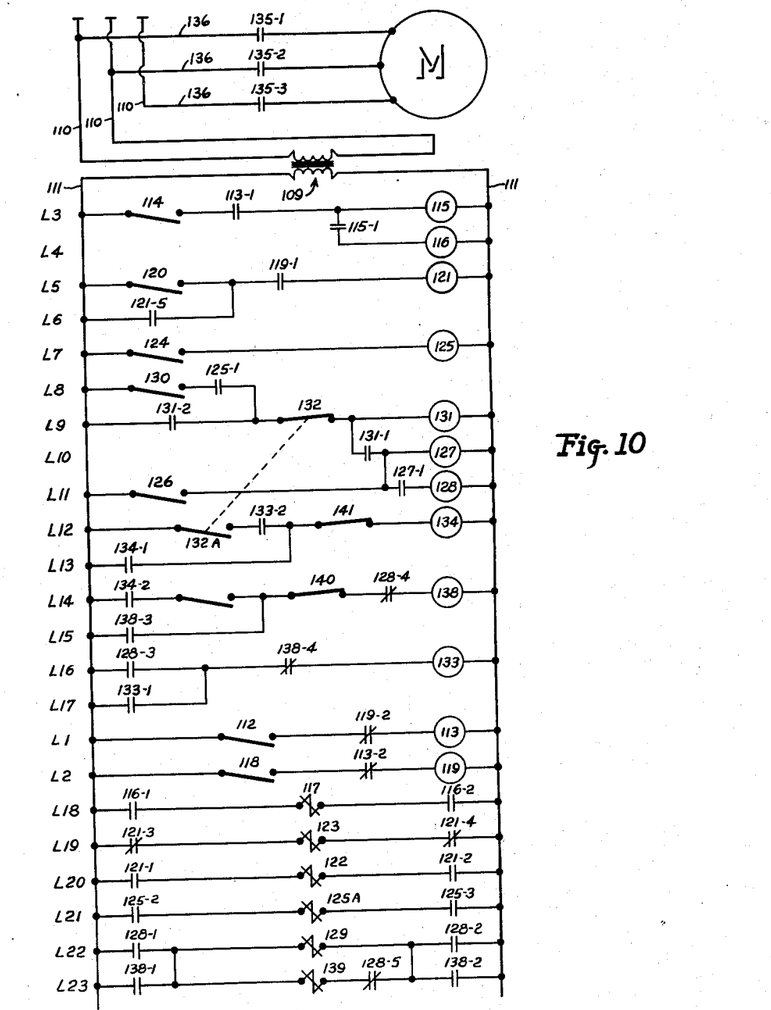
Fig. 10 is a schematic circuit diagram of the electrical circuit controlling the operation of the boom, the elevator units and the horizontal conveyor.

The operation of the boom 52, the elevator unit 78, the platform 95 and the horizontal conveyors 98 are controlled by a series of switches, as shown in Fig. 10, which are sequentially actuated.

The primary of a transformer 109 is connected to the main power lines 110 and the secondary of the transformer is connected to control power lines 111 to give the control voltage. The horizontal branch lines connected across power lines 111 are designated by an L series of numbers, such as L1, L2, etc., and the contacts actuated by a given relay are designated by the reference numeral of the relay and a hyphenated number.

With the boom 52 in the vertical position, one of the arms 53 of the boom engages and closes limit switch 112 which is secured to one of the columns 6. On closing of switch 112 in line L1, contact relay 113 is energized to close contact 113-1 in line L3 and open contacts 113-2 in line L2.

As the frame is deposited on the boom, the side rail of the frame trips a limit switch 114 in line L3 which is secured to one of the boom arms 53.

Closing switch 114 energizes relay 115 and thereby closes contact 115-1 in line L4. With the contact 115-1 closed the circuit through line L4 is completed and relay 116 is energized. Relay 116 closes contacts 116-1 and 116-2 in line L18 to energize solenoid 117 and supply fluid pressure to cylinders 74 and thereby lower the boom 52. As the boom descends switch 112 is opened, thereby de-energizing relay 115.

When the boom reaches the horizontal position, one arm of the boom engages and closes switch 118 which is secured to the supporting structure for elevator unit 78. Closing of switch 118 in line L2 energizes relay 119, as contact 113-2 in line L2 is closed, and thereby closes contact 119-1 in line L5 and opens contacts 119-2 in line L1.

The rods are spaced on the endless chains of the elevator units and moved at a velocity such that one of the rods engages and closes a limit switch 120 secured to one of the columns 6 immediately after the boom is in the horizontal position and relay 119 is energized. Closing switch 120 in line L5 energizes relay 121 to close contacts 121-1 and 121-2 in line L20 and open contacts 121-3 and 121-4 in line L9. The closing of contacts 121-1 energizes solenoid 122 to supply fluid to cylinders and thereby retract the fingers 57 and 58. As the fingers retract the frame is released onto the rods of the elevator unit. The opening of contacts 121-3 and 121-4 prevents the fingers from being extended.

Energizing relay 121 also closes contacts 121-5 in line L6 to maintain the closed circuit through relay 121 after switch 120 has been opened.

After the frame is released from the boom, the boom rises to complete its cycle and switch 118 is opened to de-energize relay 121. De-energizing relay 121 opens contacts 121-1 and 121-2 to de-energize solenoid 122 and closes contacts 121-3 and 121-4 in line L19 to energize solenoid 123 to extend the fingers 57 and 58. The boom, when reaching the vertical position, closes switch 112 and is in readiness to receive a second frame.

The first frame is moved downwardly on rods 82 and deposited on platform 95, and as the frame approaches platform 95 it engages and closes a switch 124 which is secured to the supporting structure for the elevator unit. Switch 124 in line L7 energizes relay 125 which actuates a counter mechanism designed to count the frames as they are received on the platform. This is brought about by the closing of contacts 125-2 and 125-3 in line L21 to energize the solenoid 125a which in turn actuates the counter mechanism.

In addition, the uppermost frame in the stack supported on platform 95 engages and closes a switch 126 which is also secured to the supporting structure of the elevator unit. Switch 126 in line L11 energizes relay 127 in line L10 to close contacts 127-1 and energize relay 128 in line L11. Energizing relay 128 closes contacts 128-1 and 128-2 in line L22 to energize solenoid 129 associated with cylinder 96 to index the platform downwardly. As each succeeding frame is deposited on the stack the platform is thus indexed downwardly a given distance. Energizing relay 128 also closes contacts 128-3 in line L16 and opens contacts 128-4 in line L14 and 128-5 in line L23.

When the counter mechanism has counted out a predetermined number of frames, switch 130 is closed in line L8 to energize relay 131 in line L9. The switch 132 in line L9 is normally closed except when the platform is at its lowermost position and contacts 125-1 have previously been closed by the energizing of relay 125. Energizing relay 131 closes contacts 131-1 in line L10 to energize relay 127 and thereby close contacts 127-1 and energize relay 128 to lower the platform 95. Relay 131 is locked in by closing of contacts 131-2 in line L9. Relay 133 in line L16 is energized by closing of contacts 128-4 and locked in by the closing of contacts 133-1 in line L17. Energizing relay 133 also closes contacts 133-2 in line L12 and enables the circuit to be completed through line L12 on closing of switch 132.

When the platform 95 reaches its lowermost position switch 132 in line L9 is opened to de-energize relay 128 and solenoid 129. Simultaneously, switch 132 in line L12 is closed to energize motor relay 134 and closes contacts 135-1, 135-2 and 135-3 in motor leads 136 which connect power line 110 to motor 104.

Energizing relay 134 also closes contacts 134-1 in line L13 to lock in relay 134 and closes contacts 134-2 in line L14.

The conveyors 98 are driven by motor 104 to move the stack of frames to an unloading location, and as the stack clears the platform, switch 137 in line L14 is engaged by the stack and closed to energize relay 138 and close contacts 138-1 and 138-2 in line L23 to energize solenoid 139 associated with cylinder 96 to supply fluid to the cylinder and move the platform 95 upwardly. Energizing relay 138 closes contacts 138-3 in line L15 to lock in relay 138 and opens contacts 138-4 in line L16 to de-energize relay 133.

When the platform reaches its uppermost position it triggers a normally closed switch 140 in line L14 to open the same and de-energize relay 138 to terminate the upward movement of the platform. The platform is then in position to receive the next succeeding frame from the elevator unit.

The movement of the horizontal conveyors 98 is stopped when the stack of frames reach the unloading position by engagement of the stack with switch 141. Switch 141 in line L12 is opened by the stack of frames to de-energize relay 134 and stop motor 104.

The present invention provides an apparatus for automatically conveying articles in a vertical position on a hook conveyor, releasing the article from engagement with the hook, lowering the article to a horizontal position and stacking the article for storage. The present apparatus eliminates the numerous handling operations normally employed in an unloading operation and thereby substantially reduces the labor cost and the time required for unloading.

Various modes of carrying out the invention are contemplated as being within the scope of the following claims particularly pointing out and distinctly claiming the subject matter which is regarded as the invention.

I claim:

1. An apparatus for conveying, unloading and stacking vehicle frames which comprises, a fixed framework, a series of conveyor hooks supported by said framework and movable with respect thereto, each of said conveyor hooks adapted to engage and support a vehicle frame, inclined conveyor means supported by the framework and being inclined upwardly in the direction of movement of the conveyor hooks, said inclined conveyor means adapted to be engaged by a portion of the vehicle frame and elevate the frame from the respective hook as the frame is moved with said hooks, cam means connected to said framework and disposed adjacent the uppermost end of said inclined conveyor means, said cam means disposed to inscribe a generally circular path of movement and being adapted to engage said vehicle frame as the frame approaches the uppermost end of said inclined conveyor means and move the frame forwardly out of registry with the respective hook, means pivotally connected to the framework and disposed in the downward portion of the path of movement of said cam means for receiving the frame from the cam means and lowering the frame to a horizontal position, and drive means interconnecting said conveyor hooks, said inclined conveyor means and said cam means for driving the same in synchronization.

2. An apparatus for conveying, unloading and stacking vehicle frames which comprises, a fixed framework, a series of conveyor hooks supported by said framework with each of said conveyor hooks adapted to engage and support a vehicle frame, means to move the conveyor hook at a given speed with relation to said framework, inclined conveyor means supported by the framework and being inclined upwardly in the direction of movement of the conveyor hooks, means to drive said inclined conveyor means at substantially the same speed as said conveyor hooks with said inclined conveyor means adapted to engage a portion of the vehicle frame and elevate the frame from the respective hook as the frame is moved with said hooks, a finger member disposed adjacent the uppermost end of said inclined conveyor means, cam means connected to said finger member for moving said finger member in a generally circular path of movement at a speed greater than the speed of movement of said inclined conveyor means, said finger member adapted to engage said vehicle frame as the frame approaches the uppermost end of said inclined conveyor means and move the frame forwardly out of registry with the respective hook, means pivotally connected to the framework and disposed in the downward portion of the path of movement of said finger member for receiving the frame from the finger member and lowering the frame to a horizontal position, and drive means interconnecting said conveyor hooks, said inclined conveyor means and said cam means for driving the same in synchronization.

3. An apparatus for unloading vertically disposed vehicle frames supported from a series of moving conveyor hooks which comprises, a framework, a disengaging member supported by the framework and movable at an angle upwardly with respect to the framework and adapted to engage the vehicle frame and elevate the same from the respective conveyor hook, a boom pivotally connected to the framework and having a pair of spaced outwardly extending arms, means synchronized with the movement of the disengaging member for transferring the vehicle frame from said disengaging member to the boom, holding means connected to the arms of the boom to support and hold the frame during pivotal movement of the boom, means for pivoting the boom from a generally vertical position to a generally horizontal position, and means responsive to the pivotal position of the boom for withdrawing said holding means as the boom reaches the horizontal position to thereby release the vehicle frame from engagement.

4. An apparatus for unloading vertically disposed vehicle frames supported from a series of moving conveyor hooks which comprises, a framework, releasing means connected to the framework for lifting the vehicle frame from the respective hook and for moving the same forwardly in the direction of movement of said conveyor hooks out of engagement with said hook, a boom pivotally connected to the framework and adapted to receive the vehicle frame from said releasing means when in a generally upright position and adapted to lower the frame to a generally horizontal position, said boom including a pair of spaced outwardly extending arms with the spacing between said arms being of greater dimension than the width of said vehicle frame, a series of stops extending inwardly from each of said arms toward the longitudinal center of the boom and adapted to support the vehicle frame as the boom is pivoted, means for pivoting said boom from an upright position to a generally horizontal position, and means for drawing said stops outwardly with respect to the arms when the boom reaches the horizontal position to release the frame from engagement and permit the frame to pass freely between the arms of said boom.

5. An apparatus for unloading vertically disposed vehicle frames supported from a series of moving conveyor hooks which comprises, a framework, releasing means connetced to the framework for lifting the vehicle frame from the respective hook and for moving the same forwardly in the direction of hook movement out of engagement with the hook, a boom pivotally connected to the framework and adapted to receive the vehicle frame from said releasing means when in a generally upright position and adapted to lower the frame to a generally horizontal position, said boom including a pair of spaced outwardly extending arms with the spacing between said arms being of greater dimension than the width of said vehicle frame, a series of stops extending inwardly from each of said arms toward the longitudinal center of the boom and adapted to support the vehicle frame as the boom is pivoted, means for pivoting said boom from an upright position to a generally horizontal position, a rack connected to at least one of said stops, means for reciprocating said rack to push the stop inwardly toward the center of the boom in position to support the vehicle frame when the boom is in the upright position and to draw the stop outwardly with respect to the boom to release the vehicle frame when the boom is in the horizontal position, and means interconnecting said rack and the other of said stops to actuate the other stops in synchronization with said first stop.

6. An apparatus for conveying and unloading articles which comprises, a framework, a generally horizontal track supported by the framework, a series of spaced conveyor hooks movably mounted on said track with each of said hooks adapted to engage and support one of said articles, drive means for moving said conveyor hooks along the track at a given speed, an endless conveyor supported by the framework with a portion of said endless conveyor inclined upwardly to the horizontal in the direction of movement of said conveyor hooks, second drive means connected to said first drive means for driving the endless conveyor in the same direction and at substantially the same speed as said conveyor hooks, projection means secured at spaced intervals to said endless conveyor for engaging a portion of said article and elevating the article from the respective hook as the article is moved with said hooks, a crank, an arm journaled to the crank and having a finger disposed adjacent the uppermost end of said inclined portion of the endless conveyor and adapted to inscribe a generally circular path of movement in accordance with movement of said crank, said finger being adapted to engage said article as the article approaches the uppermost end of said inclined conveyor means and move the article forwardly out of registry with the respective hook, and means for driving said crank at a substantially greater speed than said endless conveyor to permit the article to be moved forwardly and downwardly from the respective hook without interfering with movement of the hook.

7. An apparatus for unloading vertically disposed vehicle frames supported from a series of moving conveyor hooks which comprises, a framework, releasing means connected to the framework for lifting the vehicle frame from the respective hook and for moving the same forwardly out of engagement therewith, a boom pivotally connected to the framework and adapted to successively receive the vehicle frames from said releasing means when the boom is in a generally upright position, means responsive to the vertical positioning of the boom adjacent said framework and responsive to the depositing of a frame on the boom to pivot the same to a generally horizontal position, elevator means supported by the framework and disposed beneath the horizontal position of said boom, said elevator means adapted to receive the frames in succession from the boom and lower the same, a movable platform disposed beneath said elevator means and adapted to receive the frames in succession from said elevator means to form a stack of frames, means for lowering the platform in increments as each frame is received thereon and depositing said stack of frames on a conveyor member and, drive means mounted on said framework and operatively interconnecting said releasing means and said elevator means to drive the same in synchronization.

8. An apparatus for unloading vertically disposed vehicle frames supported from a series of moving conveyor hooks in the direction of conveyor hook movement which comprises, a framework, lifting means connected to the framework for lifting the frames upwardly from the respective hook and for simultaneously moving the frame at the same speed as the speed of the conveyor hooks to maintain the frame in vertical alignment with the respective hook, means synchronized with said lifting means for engaging and moving the frame forwardly at a substantially greater speed than the speed of said conveyor hooks and in the direction of movement of said hook to thereby move the frame out of registry with said hook, and pivotal means supported by the framework for receiving the frame from said last named means and lowering the same to a horizontal position.

9. An apparatus for conveying and unloading articles which comprises, a framework, a generally horizontal track supported by the framework, a series of spaced conveyor hooks movably mounted on said track with each of said hooks formed with a mouth to support one of said articles in a vertical position and having an upwardly extending lip bordering the mouth to prevent horizontal displacement of the article from the hook, drive means for moving said conveyor hooks along the track at a given speed, lifting means connected to the framework for lifting the frame upwardly out of engagement with said mouth, means synchronized with said lifting means for engaging and moving the article forwardly over the lip of the hook at a substantially greater speed than said given speed to move the frame out of registry with the respective hook, and boom means pivotally connected to the framework for receiving the frame from said last named means and lowering the same to a horizontal position.

10. An apparatus for unloading articles from a moving conveyor which comprises, a support, conveyor drive means mounted on said support, a boom pivotally secured to the support and adapted to receive the articles in succession from the conveyor while in a generally vertical position and to be pivoted to a generally horizontal position, means responsive to the vertical positioning of the boom adjacent said support and responsive to the depositing of an article on the boom for pivoting said boom, holding means connected to the boom and having an open and closed position and adapted to be in the closed position to secure the article to the boom when the boom is in the vertical position, second drive means for selectively moving said holding means to the open and closed positions, a vertical conveyor carried by the support and driven by said conveyor drive means and disposed in a plane beneath the horizontal position of the boom in location to receive the articles in succession from the boom, a hoist member disposed beneath said vertical conveyor in position to receive said articles in succession from said vertical conveyor, hydraulic fluid means for lowering the hoist member in increments of sufficient distance to permit each succeeding article to be stacked on the previously received articles, switch means engageable by the article as the article is received by the boom for actuating said first drive means to pivot said boom to the horizontal position, switch means engageable by the vertical conveyor at a predetermined location in the path of travel of said vertical conveyor for actuating said second drive means to move said holding means to the open position and release the article onto said vertical conveyor, and second switch means engageable by the article as the same is deposited by the vertical conveyor onto said hoist member for actuating said fluid means to lower said hoist member an increment to permit a second article to be stacked on said first article.

11. An apparatus for conveying unloading and stacking vehicle frames, which comprises a fixed framework, a series of conveyor hooks supported by said framework and movable with respect thereto, each of said conveyor hooks having an upwardly extending lip with said hooks being adapted to engage and support a vehicle frame, means supported by the framework to vertically elevate a frame from engagement with the respective hook and above the level of the lip while maintaining vertical alignment of the frame and hook and with substantially no relative horizontal movement therebetween, means supported by the framework and disposed to engage the elevated frame for moving the frame in the direction of hook movement at a substantially greater speed than the speed of hook movement to thereby move the frame out of vertical alignment with the hook and thereafter move the frame downwardly out of the path of travel of said hooks, means pivotally connected to the framework and disposed in the downward portion of the path of movement of said frame for receiving the frame from said second named means and lowering the frame to a horizontal position, and drive means interconnecting said conveyor hooks and said first and second named means for driving the same in synchronization.

12. An apparatus for unloading articles which comprises a fixed framework, a series of conveyor hooks supported by the framework and movable with respect thereto, each of said conveyor hooks adapted to engage and support an article, inclined means supported by the framework and inclined upwardly in the direction of movement of the conveyor hooks, said inclined means disposed to be engaged by a portion of the article and elevate the article from the respective hook, and means connected to the framework and disposed adjacent the uppermost end of said inclined means, said last named means disposed to inscribe a given path of movement separate from the path of movement of said inclined means and being disposed to engage the article as the article approaches the uppermost end of said inclined means and move the article forwardly out of registry with the respective hook.

13. An apparatus for unloading articles which comprises a fixed framework, a series of conveyor hooks supported by the framework and movable with respect thereto, each of said conveyor hooks adapted to engage and support an article, inclined means supported by the framework and inclined upwardly in the direction of movement of the conveyor hooks, said inclined means disposed to be engaged by a portion of the article and elevate the article from the respective hook, transfer means connected to the framework and disposed adjacent the uppermost end of said inclined means, said transfer means disposed to inscribe a given path of movement separate from the path of movement of said inclined means and being disposed to engage the article as the article approaches the uppermost end of said inclined means and move the article forwardly out of registry with the respective hook, lowering means pivotally connected to the framework and disposed in the path of movement of said transfer means for receiving the article from said transfer means and lowering the article to a horizontal position, and drive means interconnecting said series of conveyor hooks, said inclined means and said transfer means for driving the same in synchronization.

References Cited in the file of this patent

UNITED STATES PATENTS

| | | |
|---|---|---|
| 1,650,971 | Young | Nov. 29, 1927 |
| 1,688,219 | Williams | Oct. 16, 1928 |
| 1,735,443 | Randles et al. | Nov. 12, 1929 |
| 1,923,663 | Coda | Aug. 22, 1933 |
| 1,951,178 | Smitmans | Mar. 13, 1934 |
| 1,951,400 | Dvorak | Mar. 20, 1934 |
| 1,983,755 | Heichert | Dec. 11, 1934 |
| 2,102,337 | Rose | Dec. 14, 1937 |
| 2,328,388 | Morgan et al. | Aug. 31, 1943 |
| 2,627,354 | Isella et al. | Feb. 3, 1953 |
| 2,655,271 | Cole | Oct. 13, 1953 |
| 2,699,264 | Bruce et al. | Jan. 11, 1955 |
| 2,703,182 | Broberg et al. | Mar. 1, 1955 |
| 2,770,373 | Verrinder et al. | Nov. 13, 1956 |